United States Patent
Matsuura et al.

(10) Patent No.: US 6,705,431 B2
(45) Date of Patent: Mar. 16, 2004

(54) METHOD FOR LUBRICATING A ROTATIONAL-PART SUPPORTER

(75) Inventors: Yasumaro Matsuura, Fukui (JP); Kikuta Yamada, Fukui (JP); Seiji Tanaka, Fukui (JP)

(73) Assignee: IMN Co., Ltd., Fukui (JP)

( * ) Notice: Subject to any disclaimer, the term of this patent is extended or adjusted under 35 U.S.C. 154(b) by 7 days.

(21) Appl. No.: 10/028,591

(22) Filed: Dec. 20, 2001

(65) Prior Publication Data

US 2003/0019691 A1 Jan. 30, 2003

(30) Foreign Application Priority Data

Jul. 27, 2001 (JP) ........................................ 2001-227128

(51) Int. Cl.[7] .................................................. F16N 7/14
(52) U.S. Cl. ........................ 184/7.4; 184/39.1; 384/462
(58) Field of Search ........................ 184/7.1, 7.4, 39.1, 184/55.1, 76, 105.2; 384/462, 471, 473, 474, 475

(56) References Cited

U.S. PATENT DOCUMENTS

| | | | | |
|---|---|---|---|---|
| 4,324,316 A | * | 4/1982 | Thrasher et al. | 184/29 |
| 4,520,902 A | * | 6/1985 | Snow | 184/7.4 |
| 4,527,661 A | * | 7/1985 | Johnstone et al. | 184/6.1 |
| 4,836,334 A | * | 6/1989 | Bras | 184/45.1 |
| 5,181,585 A | * | 1/1993 | Braun et al. | 184/7.4 |
| 5,192,139 A | * | 3/1993 | Hiramoto et al. | 384/476 |
| 5,381,874 A | * | 1/1995 | Hadank et al. | 184/6.4 |
| 5,971,107 A | * | 10/1999 | Stitz et al. | 184/7.4 |
| 6,105,724 A | * | 8/2000 | Stitz et al. | 184/7.4 |
| 6,443,623 B2 | * | 9/2002 | Sugita et al. | 384/466 |

* cited by examiner

*Primary Examiner*—David A. Bucci
*Assistant Examiner*—Timothy McAnulty
(74) *Attorney, Agent, or Firm*—Richard M. Goldberg

(57) ABSTRACT

A rotational-part supporter has a structure in which one of either an inner part or an outer part is fixed, and the other one is rotated, and a main rotational shaft lies between the inner and outer parts. A revolving speed below a revolving speed based on a lubrication lifetime predicted for each rotational bearing (3) is stored in a memory (61) disposed in the lubricant supply controller (6). When a revolving speed obtained by actual rotation coincides with the stored revolving speed in the rotational bearing (3) after supplying the lubricant, the controller (6) issues a signal indicating that the lubricant should be newly supplied, and thereby a safety operation can be realized.

2 Claims, 3 Drawing Sheets

METHOD FOR LUBRICATING A ROTATIONAL-PART SUPPORTER

BACKGROUND OF THE INVENTION

This invention relates to a method for supplying the lubricant (i.e., lubricating oil) to a rotational-part supporter that is employed in a rotational device such as an electric motor or a spindle.

Grease lubrication is a method for applying a fixed quantity of grease onto bearing members when the bearing members are assembled. According to this method, since the machine is operated almost without later grease-resupply, almost all the grease applied when the bearing members were first rotated is scattered to their surroundings, and, as a result, the grease left on the track surface is very small in quantity. Therefore, the bearing members cannot be rotated for a long time, and, in addition, their lifetimes are highly unstable.

Oil mist lubrication is a method for lubricating a rotational part of a bearing while spraying oil misty onto the rotational part by means of compressed air. According to this method, heat generation can be reduced, and the bearing can be used as a high-speed rotatable one. However, a problem resides in that an exclusive oil mist generator is needed, which raises costs, and in that the emission of exhaust gas that includes oil contaminates the surrounding environment.

Oil air lubrication is a method for lubricating a rotational part of a bearing with a small quantity of oil by means of compressed air. According to this method, heat generation can be reduced, and the bearing can be used as a high-speed rotatable one. However, a problem resides in that an exclusive oil air-lubricating device is needed, which raises costs, and in that the emission of exhaust gas that includes oil contaminates the surrounding environment.

Jet lubrication is a method for pouring a large quantity of cooled oil onto a rotational part of a bearing. This method is superior in cooling, and is used for high-speed rotatable bearings. However, disadvantageously, very great power is required to rotate a shaft, and machine costs are high-priced as the machine needs a large quantity of oil that is controlled at a constant temperature. Therefore, this method is applied only to very limited uses, such as bearings of an aircraft engine.

As described above, all of the conventional methods of lubricating a rotational-part supporter have both merits and demerits. Generally, the quantity of the lubricant to be supplied increases as the speed of the rotational bearing increases.

However, the prior art according to the aforementioned methods has no basic construction in that the quantity of the lubricant to be supplied is properly varied in accordance with a variation in rotational speed.

In consideration of the above circumstances of the conventional methods, the present invention aims to provide the basic structure of a lubricating method capable of supplying an appropriate lubricant in accordance with a variation in rotational speed of a rotational bearing.

SUMMARY OF THE INVENTION

In order to solve the aforementioned problems, the present invention has a rotational-part lubricating method in which, in a rotational-part supporter in which one of either the inner or outer parts is fixed, and the other one is rotated, and a main rotational shaft lies between the inner and outer parts, a predetermined quantity of the lubricant is supplied to a rotational bearing at predetermined time intervals, and either the time interval or a supply of lubricating oil at one time is adjusted or, alternatively, both of them are adjusted in accordance with rotational speed.

DETAILED DESCRIPTION OF THE INVENTION

Figure 4A:
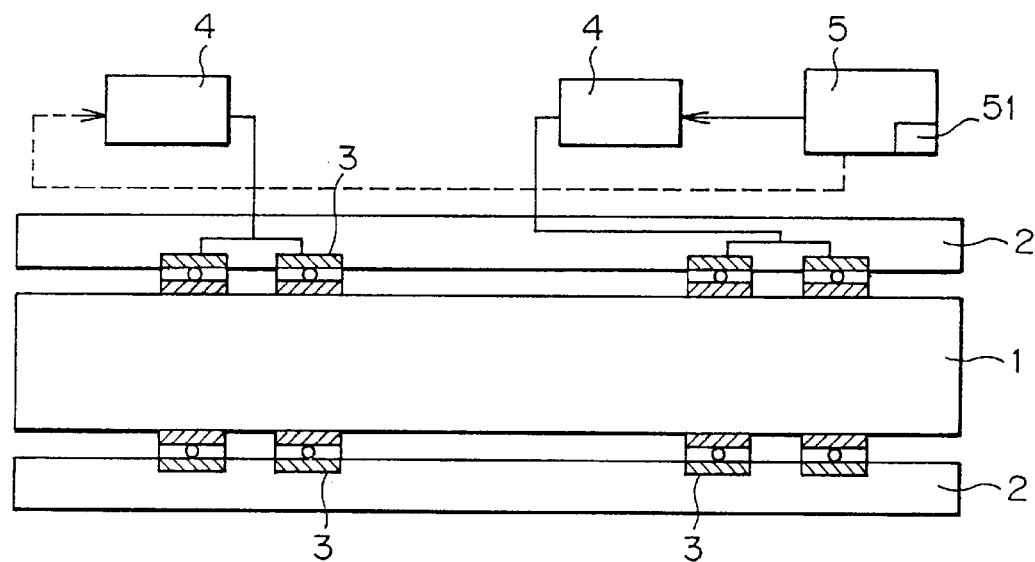
FIG. 4 is a side sectional view showing the structure of a rotational-part supporter to which a method for the present invention is applied, in which (a) shows a case where a rotor is disposed at an inner part, and (b) shows a case where the rotor is disposed at an outer part.
Figure 4B:
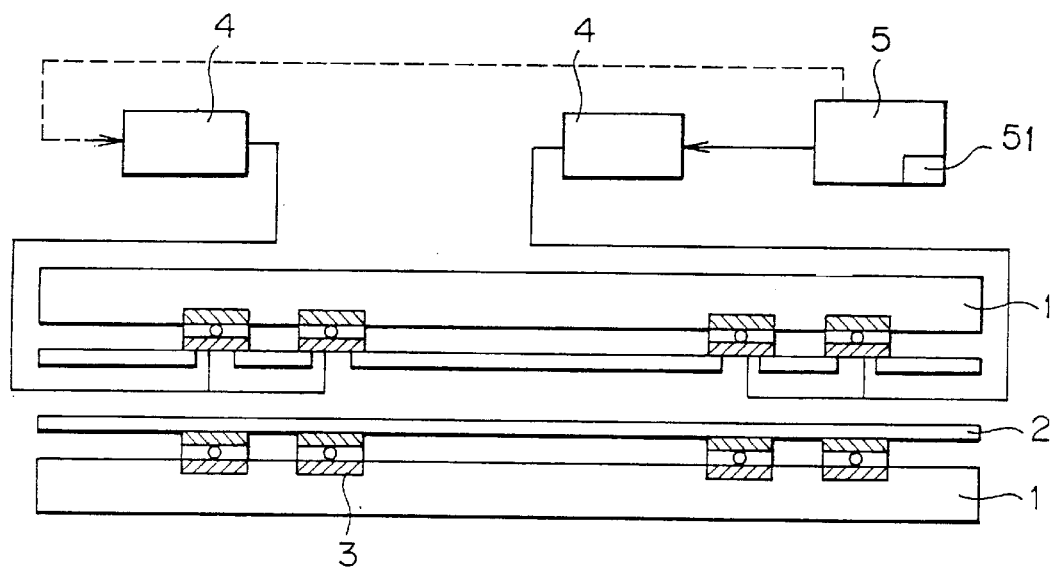

As shown in FIG. 4, the rotational-part supporter that realizes the method for the present invention is formed as a rotational-part supporter (in the case of (a) of FIG. 4) that comprises an outer stator 2 and an inner rotor 1 or as a rotational-part supporter (in the case of (b) of FIG. 4) that comprises an outer rotor 1 and an inner stator 2. In both cases, a rotational bearing 3 lies between the rotor 1 and the stator 2.

The present invention is characterized in that either of or both of the lubricant supply time with predetermined time intervals and/or the lubricant supply quantity at one time are determined in accordance with the speed of the rotational bearing 3.

In practice, according to the rotational speed of the rotor 1, a command concerning an appropriate time interval stored in a memory 51 and the lubricant supply quantity at one time is transmitted to the lubricant supply device 4 by means of a computer 5.

The only way to determine the appropriate time interval and the appropriate supply quantity at one time for lubricating each rotational bearing 3 in accordance with a predetermined rotational speed is to perform trial-and-error experiments. The appropriate time interval and the appropriate supply quantity cannot be calculated at one try by a specific theory.

Needless to say, the appropriate time interval and the appropriate supply quantity in one time fall within a certain range, and they are not limited to specific values.

On the other hand, there is a correlation between the time interval with which the lubricant is supplied and the supply quantity at one time. The shorter the time interval, the smaller the supply quantity at one time. The two stand in a roughly proportional relationship.

If the lubricant supply quantity at one time is too great, the very existence of the lubricant in a rotational bearing causes friction, and raises the temperature of the rotational bearing immediately after the lubricant is supplied.

Therefore, with respect to each rotational bearing 3, the upper limit of the lubricant supply quantity at one time is based on whether the temperature sharply rises or not immediately after the lubricant is supplied, and the upper limit of such the lubricant supply quantity at one time so as not to bring about a sudden rise in temperature is confirmed beforehand by an experiment.

By this confirmation, the time just before the temperature is raised can be set as a maximum time interval under a condition where the lubricant is supplied within the upper limit and thereafter the rotational bearing 3 is continuously rotated at a predetermined speed.

However, a time interval and a supply quantity at one time that can be set with respect to a predetermined rotational speed are not limited to the aforementioned maximum time interval and the upper limit of the supply quantity.

In other words, it is fully possible to establish an appropriate supply condition in such a way so as to set a standard for a time interval shorter than the maximum time interval and so as to have a supply quantity smaller than the upper limit of the aforementioned supply quantity.

If the shorter time interval than the maximum time interval is set as a standard, a supply quantity at one time that corresponds to the standardized time interval can be calculated according to the formula: (standardized time interval) ÷(maximum time interval)×(upper limit of the aforementioned supply quantity at one time).

The reason being that there is a roughly proportional relationship between an appropriate time interval and an appropriate supply quantity at one time.

The supply quantity at one time obtained by the above calculation corresponds to a minimum value of an appropriate supply quantity at one time under the condition of the desired time interval as a result of dividing by the maximum time interval.

If the lubricant supply quantity at one time is successively increased to be greater than the minimum value under the condition of the standardized time interval, the rotational bearing 3 will be gradually filled with the lubricant, and the temperature of the rotational bearing 3 will gradually rise when the lubricant supply quantity at one time is too great.

Therefore, the lubricant supply quantity at one time just before a sequential rise in temperature occurs corresponds to a maximum value of an appropriate supply quantity under the standardized time interval.

Accordingly, if a time interval shorter than the aforementioned maximum time interval is set as a standard, a minimum value obtained according to the above formula, a maximum value confirmed by the above experiment, and an intermediate value between the two correspond to the appropriate lubricant supply quantity at one time.

Embodiments
Embodiment 1

Embodiment 1 shows the structure of a preferred lubricating device in the present invention.

Figure 1A:
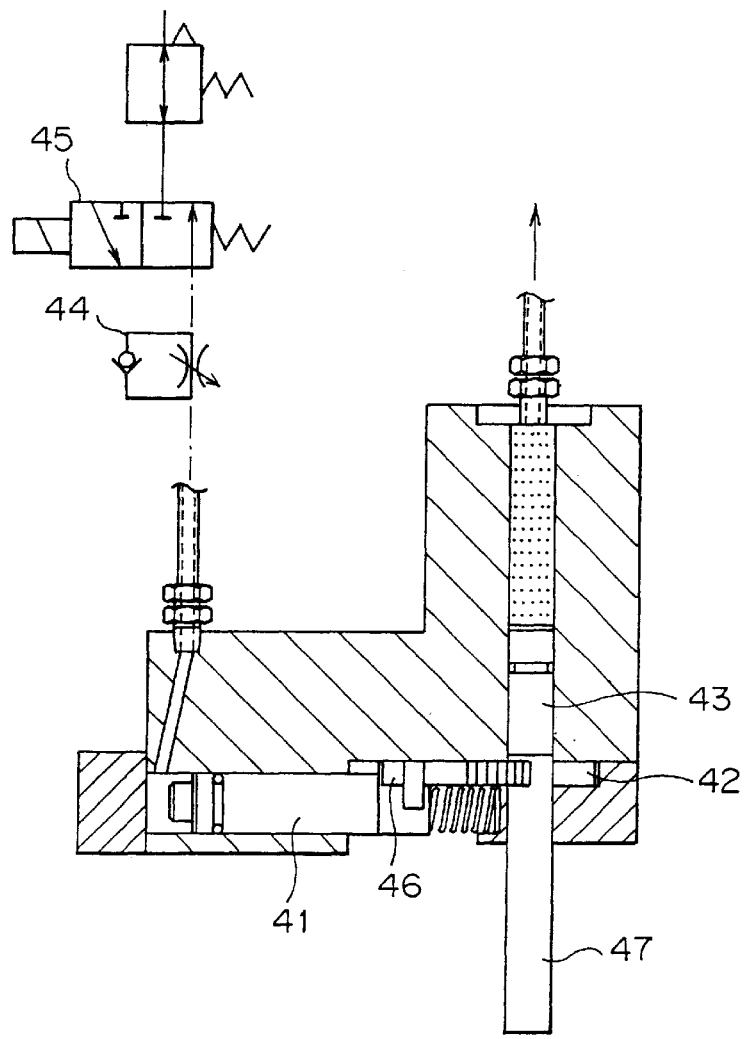
FIG. 1 shows the lubricant supply device according to a first embodiment, in which (a) is a side sectional view of the direction in which the lubricant is emitted, and (b) is a side sectional view perpendicular to the emitting direction.
Figure 1B:
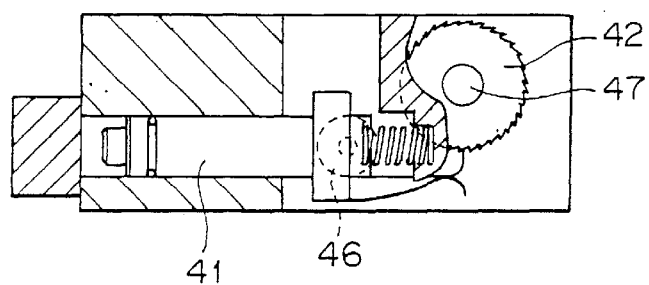

In Embodiment 1, as shown in FIG. 1, a ratchet 42 is rotated by an air cylinder 41 that moves a ratchet pawl 46, and a piston 43 disposed at an end of a screw 47 is slightly moved by the screw 47 disposed at the center of the ratchet 42. As a result, a small quantity of the lubricant is emitted, and thereby the lubricant at one time can be supplied in accordance with a predetermined time interval.

A gear, instead of the ratchet 42, can be placed and be rotated by a pulse motor.

If a flow rate control valve 44 is disposed in an operating circuit of the air cylinder 41 as shown in FIG. 1, the supply of the lubricant can be brought into a sluggish state.

Such a sluggish supply is effective especially when a highly viscous lubricant, such as grease, is used.

When a highly viscous lubricant like grease is supplied, a necessary quantity of the lubricant cannot be completely emitted by the rapid movement of the piston 43 because of the resistance of the pipe line, but, if air is supplied by the flow rate control valve 44 while taking much time as shown in FIG. 1, the necessary quantity thereof can be completely emitted.

Embodiment 2

Embodiment 2 is characterized in that the computer 5 calculates an appropriate time interval and an appropriate lubricant supply quantity at one time with respect to the arbitrary revolving speed of each individual rotational bearing 3 in order to automate the lubricant supply method for the present invention.

Figure 2A:
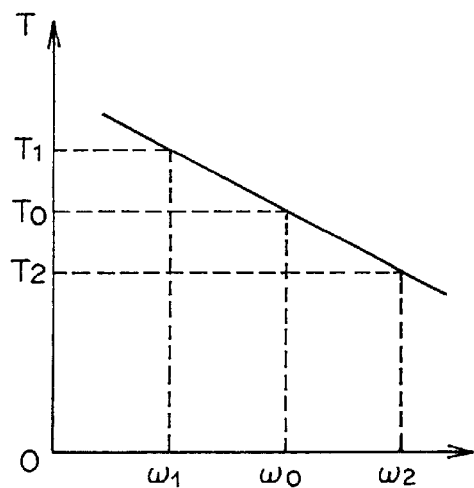
FIG. 2 is a graph for explaining the calculation of proportional distribution in a second embodiment, in which (a) shows the relationship between rotational speed and an appropriate time interval, and (b) shows the relationship between rotational speed and an appropriate supply at one time.
Figure 2B:
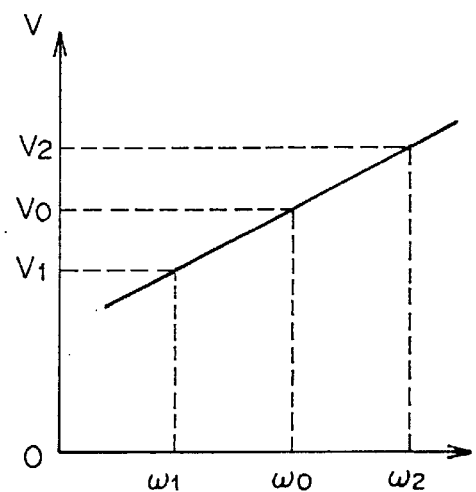

This calculation is performed as follows. An appropriate time interval and an appropriate supply quantity at one time are preset with respect to a plurality of revolving speeds. When an input signal by a specific rotational speed ($\omega$) is sent to the computer 5, the rotational bearing 3 selects revolving speeds on both sides that are nearest to the revolving speed according to the input signal, i.e., a maximum value $\omega_1$ of revolving speeds smaller than the revolving speed according to the input signal and a minimum value $\omega_2$ of revolving speeds greater than the revolving speed according to the input signal from among the plurality of stored revolving speeds as shown in the graph of FIG. 2. In order to obtain an appropriate time interval $T_0$ corresponding to the rotational speed $\omega_0$ according to the input signal and obtain an appropriate supply quantity $V_0$ at one time, calculation of proportional distribution is performed according to the following formulas as shown in (a) and (b) of FIG. 2:

$$(T_1-T_0)/(T_0-T_2)=(\omega_0-\omega_1)/(\omega_2-\omega_0)$$

$$(V_2-V_0)/(V_0-V_1)=(\omega_2-\omega_0)/(\omega_0-\omega_1)$$

Thereafter, the following formulas are obtained:

$$T_0=\{T_1(\omega_2-\omega_0)+T_2(\omega_0-\omega_1)\}/(\omega_2-\omega_1)$$

$$V_0=\{V_1(\omega_2-\omega_0)+V_2(\omega_0-\omega_1)\}/(\omega_2-\omega_1)$$

where $T_1$ is an appropriate time interval corresponding to the revolving speed $\omega_1$, $V_1$ is an appropriate supply quantity at one time, $T_2$ is an appropriate time interval corresponding to the rotational speed $\omega_2$, and $V_2$ is an appropriate supply quantity at one time.

From this proportional-distribution calculation, a known empirical rule exists where, in practice, an appropriate time interval and an appropriate supply quantity at one time can be set with respect to various rotational speeds.

Embodiment 3

Figure 3:
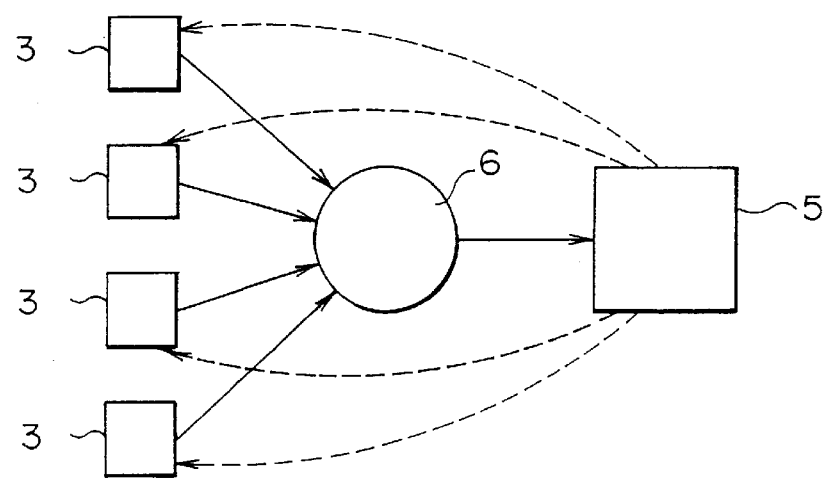
FIG. 3 is a block diagram for explaining a third embodiment.

Embodiment 3 is characterized in that, as shown in FIG. 3, a single computer 5 is used for a plurality of rotational-part supporters and a plurality of corresponding rotational bearings 3, thus overcoming the uneconomical situation of Embodiment 2 that employs a system in which a time interval and a supply quantity at one time are determined according to calculations, and in which the computers 5 are assigned to the plurality of rotational bearings 3, respectively.

However, the computer 5 cannot receive rotational-speed-indicating signals from each of a plurality of rotational bearings and perform calculations simultaneously.

In Embodiment 3, the single computer 5 is connected to the plurality of rotational bearings 3 through a discrimination circuit 6. Each rotational bearing 3 transmits a rotational-speed-indicating signal and a discrimination signal to the discrimination circuit 6. The discrimination circuit 6 has a circuit part that determines the order of the times when the respective signals have been input.

If the respective signals are received at different times, a step of temporarily storing the signals in the memory 51 in the order of reception is executed, or, alternatively, the signals are transmitted to the computer 5 without executing this signal-storing step. If a part of or all of the respective signals are received at the same time, the rotational-speed-indicating signals and the discrimination signals that are received at the same time are stored in the memory 51, and the order of the input signals from each of the rotational bearings 3 that are received at the same time is determined according to the order predetermined by a program, and the signals received at the same time are transmitted to the computer 5 in the determined order.

In order to supply the lubricant on the basis of the signals that indicate the speed of each rotational bearing 3 that is sequentially transmitted by the discrimination circuit 6, the computer 5 can perform calculation of an appropriate time interval and an appropriate lubricant supply quantity at one time, and can transmit output signals resulting from the calculation to each rotational bearing 3 on the basis of the discrimination signals sent from the discrimination circuit 6.

As described above, in Embodiment 3, the rotational-speed-indicating signals and the discrimination signals are sequentially input from the discrimination circuit 6 to the computer 5 according to a predetermined order, and a given calculation is performed even if the rotational-speed-indicating signals are input from the rotational bearings 3 at the same time. Therefore, serious obstacles do not arise in controlling an appropriate time interval and an appropriate supply quantity at one time.

EFFECT OF THE INVENTION

In the present invention having the above-mentioned structure, the lubricant can be supplied rationally and appropriately, and thus an accident due to the wear of a rotational bearing can be prevented, and the rotational bearing can be safely operated for a long time.

Especially in the device of Embodiment 1, the present invention can be suitably applied to the lubricant supply, and appropriate processing can be applied to a highly viscous lubricant such as grease.

According to the computer processing of Embodiment 2, automatic control can be carried out for an appropriate time interval and an appropriate supply quantity with respect to various rotational speeds. According to the system of Embodiment 3, a single computer can operate a plurality of rotational bearings extremely economically.

Thus, the present invention has multifaceted merits, and its value is great.

What is claimed is:

1. A method for lubricating a rotational-part supporter, the rotational-part supporter having an inner part and an outer part in which one of the inner part and outer part is fixed, and the other of the inner part and outer part is rotated, and a main rotational bearing lies between the inner and outer parts, the method comprising the steps of:
supplying a predetermined quantity of lubricant to the rotational bearing at predetermined time intervals, and adjusting at least one of the following in accordance with a rotational speed of the rotational bearing:
said time intervals, and
the lubricant supply quantity at one time; and
further comprising the steps of:
prestoring both a lubricant supply time interval and the lubricant supply quantity at one time that correspond to a plurality of rotational speeds in accordance with a revolving speed of the rotational bearing;
standardizing a corresponding time interval $T_0$ and a corresponding supply quantity $V_0$ at one time for a minimum value of a rotational speed $\omega_1$, larger than a rotational speed $\omega_0$ input to a computer and a maximum value of a rotational speed $\omega_2$, smaller than said rotational speed $\omega_0$,
wherein said rotational speeds $\omega_1$ and $\omega_2$ are input to the computer as a plurality of rotational speeds prestored with respect to an input signal denoting an actual rotational speed maintained for each rotational bearing;
performing the following proportional-distribution calculation based:

$$(T_1-T_0)/(T_0-T_2)=(\omega_0-\omega_1)/(\omega_2-\omega_0),$$

$$(V_2-V_0)/(V_0-V_1)=(\omega_2-\omega_0)/(\omega_0-\omega_1),$$

wherein $T_1$ is an appropriate time interval corresponding to the rotational speed $\omega_1$, $T_2$ is an appropriate time interval corresponding to the rotational speed $\omega_2$, $V_1$ is an appropriate supply quantity at one time corresponding to the rotational speed $\omega_1$, and $V_2$ is an appropriate supply quantity at one time corresponding to the rotational speed $\omega_2$;
calculating an appropriate lubricant supply time interval and an appropriate lubricant supply quantity at one time that correspond to the rotational speed by the input signal in accordance with the proportional-distribution calculation; and
issuing a command to a lubricant supply device.

2. The method of claim 1, further comprising the steps of:
connecting a single computer to a plurality of rotational bearings through a discrimination circuit,
sending a rotational-speed-indicating signal and a discrimination signal to the discrimination circuit from each rotational bearing,
determining an order at which the signals are input from each rotational bearing to the computer by a circuit part of the discrimination circuit;
in a case where the respective signals are received at different times, executing a process of one of the following:
temporarily storing each of the signals in a memory, and
sending the signals to the computer without executing the signal storing step, according to the order of reception;
in a case where at least a part of the signals are received at the same time, storing the rotational speed indicating signal and the discrimination signal that have been received at the same time in the memory, and determining an order of the input signals from each rotational bearing that are received at the same time according to an order predetermined by a program;
sending each of the signals received at the same time to the computer according to the determined order;
allowing the computer to perform calculations of an appropriate time interval and an appropriate lubricant supply quantity at one time in order to supply the lubricant on the basis of the signal that indicates the speed of each rotational bearing that is sent from the discrimination circuit; and
sending an output signal based on the calculation to each rotational bearing on the basis of the discrimination signal sent from the discrimination circuit.

* * * * *